United States Patent [19]

Eshelman

[11] Patent Number: 4,646,042

[45] Date of Patent: Feb. 24, 1987

[54] SPEED AND DISTANCE SENSOR

[75] Inventor: Robert W. Eshelman, Ann Arbor, Mich.

[73] Assignee: Hi-Stat Manufacturing Co., Inc., Sarasota, Fla.

[21] Appl. No.: 699,754

[22] Filed: Feb. 8, 1985

[51] Int. Cl.[4] .................................... H01H 9/00

[52] U.S. Cl. .................................... 335/205; 324/174

[58] Field of Search .................... 335/205, 207, 93; 310/156; 324/173, 174, 208; 361/240; 200/19 DR, 19 M; 123/350, 352, 353, 476, 494

[56] References Cited

U.S. PATENT DOCUMENTS 3,291,109 12/1966 Neapolitakis .................... 200/19 M 4,321,495 3/1982 Kennedy .......................... 324/174 X

*Primary Examiner*—L. T. Hix

*Assistant Examiner*—Brian W. Brown

*Attorney, Agent, or Firm*—Rhodes and Boller

[57] ABSTRACT

A speed and distance sensor comprises a circular magnet supported on a shaft journaled on a housing. The magnet is polarized at regular circumferential intervals and is accurately axially located within the housing. A reed switch is disposed adjacent the rotating magnet and is coupled with the varying magnetic field produced by the rotating magnet so that the reeds open and close as the magnet rotates. The reed switch is mounted within the housing on a retainer, and the retainer is selectively positionable via an adjustment screw for precisely positioning the reed switch in relation to the magnet to achieve a degree of coupling which produces a desired duty cycle characteristic in the opening and closing of the reed switch. A wiring harness is connected with the leads of the reed switch to provide for connection with an external electronic circuit. The wires and leads are accurately located by means of locators formed in the housing to promote convenient assembly. In another embodiment the reed switch mounts on the housing by means of its own lead wires, and a compensator on the housing is operable to control the amount of flux from the magnet which acts on the reed switch.

30 Claims, 8 Drawing Figures

SPEED AND DISTANCE SENSOR

BACKGROUND AND SUMMARY OF THE INVENTION

This invention relates to a speed and distance sensor for providing an electrical output signal from a rotating input shaft. For example, the invention has particular utility in an automotive vehicle where the input shaft is driven by the drivetrain.

In modern automobiles the increasing usage of electronics requires sensors which interface between the electronics and various mechanical components of the automobile. For example it is often desired to sense speed and/or distance for purposes of displaying information and/or control. As such, a sensor may be employed in cooperative association with a mechanical input to provide an electrical output signal correlated with the mechanical input. In the case of an electronic speedometer and/or odometer, a speed and distance sensor can be coupled with the drivetrain of the automobile to provide an electrical signal input to the electronic display containing the speedometer and/or odometer.

Various types of speed and distance sensors are known. Speed and distance are of course mathematically related with speed being the derivative of distance to time. Stated the other way, distance is the integral of speed to time. The nature of the electronic system to which the sensor supplies an input may have a bearing on the nature of acceptable sensor characteristics. For example, one known type of sensor simply produces a train of impulses and the frequency of the pulses is used to provide a speed and distance signal.

The present invention is, in one aspect, directed to a sensor in which it is important to have a characteristic wherein the duty cycle of the output must be closely controlled. A sensor providing this type of a characteristic is required for electronic systems which sample a rectangular waveform in accordance with a particular algorithm for obtaining a speed and/or distance measurement. For this type of usage, a sensor which merely produces a variable frequency pulse without regard to duty cycle characteristics is not an acceptable device.

Moreover, automotive usage imposes severe demands on products. Because of the mass production nature associated with the automobile business, it is important for a sensor to be cost-effective; yet it must be reliable when put to use in a range of extremes involving temperature, humidity, exposure, etc. For example a speed and distance sensor may be located in the engine compartment or in the vicinity of the undercarriage where it is exposed to extreme environmental conditions. An acceptable device must be rugged, reliable, accurate, and cost-effective.

It is also desirable for a speed and distance sensor to be adaptable to different powertrain configurations with no or at most nominal, modification.

The present invention is directed to a sensor which is well-suited for the demands of automotive usage.

One significant attribute of the present invention in the preferred embodiment is that it makes use of a conventional reed switch as the device which provides the electrical output signal. A reed switch is a known component and can be purchased in quantity at reasonable cost. However, such reed switches are not precision components. The present invention enables such a reed switch to provide close control of the duty cycle output and thereby achieve a satisfactory degree of accuracy for automotive usage.

The sensor of the present invention is well-suited to be fabricated as a compact, rugged unit without complicated assembly and fabrication procedures, and without high precision, and hence costly, parts. Because of the unique organization and arrangement of the component parts, it is possible for a magnet which forms a part of the sensor to be fabricated from less expensive magnetic materials than might otherwise be thought appropriate. The invention can also be readily adapted to conform to various automobile powertrain configurations depending upon the specific usage to which it is put. For instance a sensor can be driven by a mechanical speedometer cable, or it can be connected at the transmission.

The foregoing features, advantages, and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

DESCRIPTION OF THE PREFERRED EMBODIMENT

Figure 1:
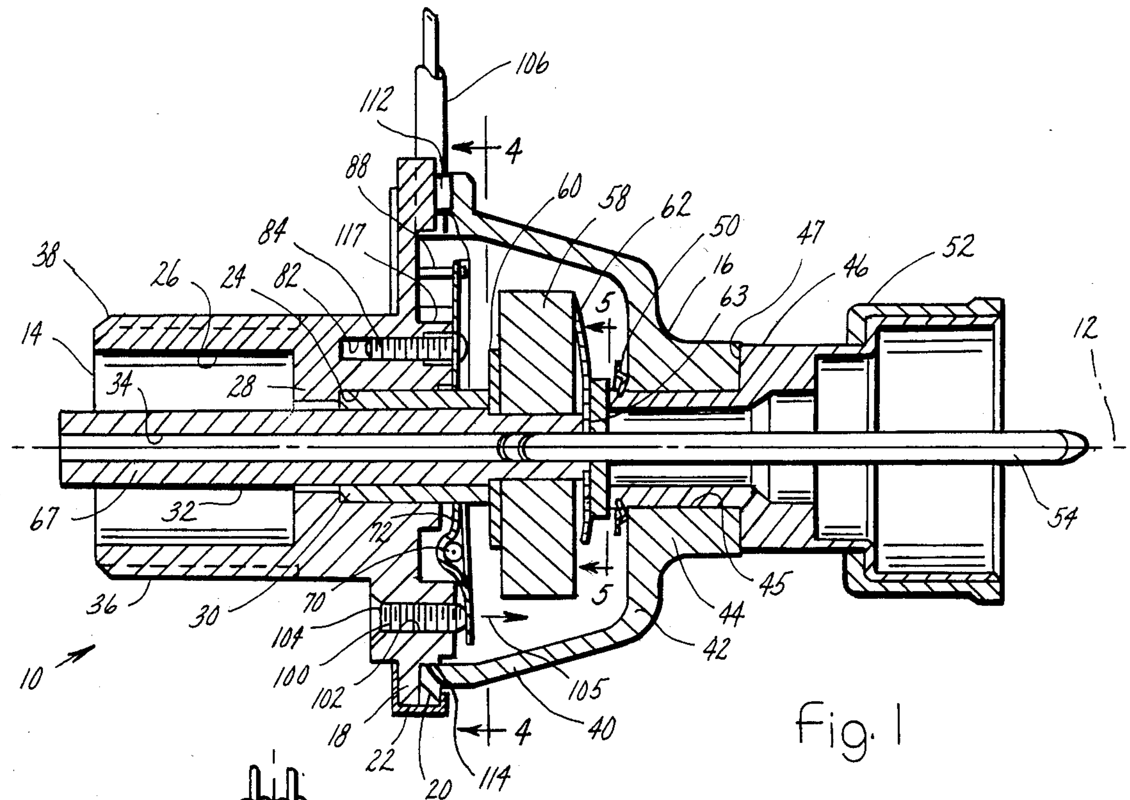
FIG. 1 is a longitudinal cross sectional view through an embodiment of sensor according to the present invention.
Figure 2:
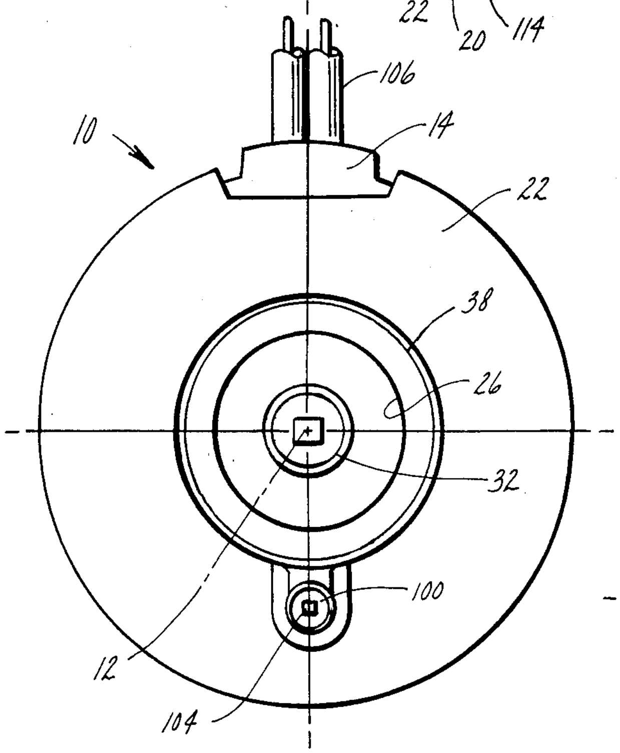
FIG. 2 is a left axial end view of the sensor in FIG. 1.
Figure 3:
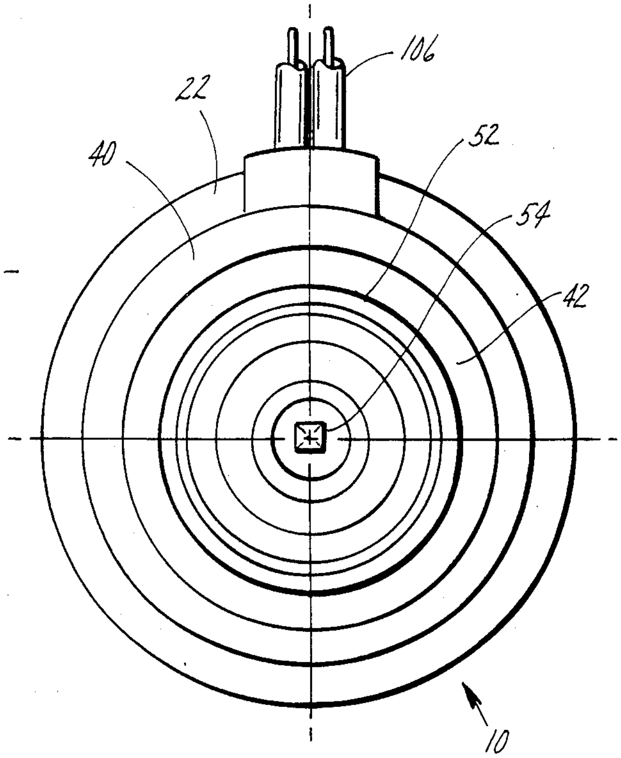
FIG. 3 is a right axial end view of the sensor in FIG. 1.

FIGS. 1-5 illustrate a sensor 10 embodying principles of the present invention. The reference numeral 12 designates the longitudinal axis of the sensor. The sensor comprises a housing cooperatively defined by two mating housing parts 14 and 16. The two housing parts are generally symmetrical about axis 12 and they comprise mating circular flanges 18 and 20 respectively which are held together in assembly by a crimp ring 22 of generally circular shape. The two housing parts 14 and 16 are so constructed that a throughbore extends completely through the housing along axis 12.

In housing part 14 the throughbore may be considered to comprise two sections 24 and 26 respectively which are divided by a radially inwardly directed circular flange 28. A tubular bearing 30 is disposed within section 24 and serves to provide a journal for a shaft 32 which passes coaxially through the housing along axis 12.

Bearing 30 serves to journal an intermediate portion of shaft 32 while the left-hand end portion of the shaft, as viewed in FIG. 1, extends within the larger diameter bore section 26 and is provided with a hole 34 of square (i.e. polygonal) cross section so that it forms a socket for connection with the tip of the driving, or driven, member (not shown), such as a speedometer cable.

The outside diameter of housing part 14 comprises a thread 36 immediately adjacent its left-hand end for mating connection with a conventional fitting (not shown), such as a speedometer cable nut. The O.D. at the end of housing part 14 is provided with a conical surface 38 to form a seal against a bell-mouthed cable fitting which is urged against the end of the housing part when the nut is tightened onto thread 36. The slightly resilient character of the plastic provides a seal against the bell-mouth, and this construction has the advantage of eliminating the need for a separate gasket to form the seal. When the cable assembly is connected to the sensor, the seal prevents the intrusion of undesired contaminants, and/or loss of lubricant.

Housing part 16 comprises an axial wall 40 extending away from flange 20 to a radial end wall 42. The illustrated axial wall 40 has a slight taper. A short circular wall 44 is provided at the inner periphery of end wall 42 and defines a bore portion 45. A tubular part 46 has a portion press fitted within bore portion 45. Part 46 has a shoulder 47 abutting the right-hand end of circular wall 44, and the part 46 is axially retained on the housing part 16 by means of a retaining ring 50 which is fitted onto a circular groove extending around the outside of tubular part 46 at the left-hand end of circular wall 44 and bearing against that end of wall 44.

A conventional threaded fitting 52 (i.e. a nut) is retained on the end of tubular part 46 outside of the housing. This fitting is adapted to connect to a complementary mating part (not shown).

The drive shaft 32 comprises a tip 54 which projects from the housing, passing through tube 46 and the fitting 52. Tip 54 has a non-circular cross section (i.e. square, for example) for making connection with a complementary socket of mating cross section, (not shown). A seal may be provided to seal the connection.

A magnet 58 is supported on shaft 32 within the interior of the housing. The illustrated magnet 58 has a circular shape, and rotates with shaft 32. The magnet is polarized at regular circumferential intervals. The polarization is made in the radial or axial face of the magnet, and the number of magnetic poles may be an integral multiple of two. For example in the illustrated embodiment there may be four pairs of poles which alternate around the circumference of the magnet, as schematically portrayed in FIG. 5.

A compensator in the form of a circular disc 60 is disposed between magnet 58 and the right-hand end of bearing 30 which projects beyond the right hand end of bore portion 24 of housing part 14.

A spring 62 is disposed between the right hand end face of magnet 58 and a thrust washer 63 which itself is between the spring and the left hand end of part 46. Details of spring 62 can be seen with reference to FIGS. 1 and 5. Spring 62 comprises a central circular hole 64 fitting onto a circular recess on shaft 32. A plurality of resilient fingers 66 project both radially and axially from the central region of the spring. In the illustrated embodiment there are three such fingers 66 which are arranged at equal angular spacings of 120° about axis 12.

FIG. 1 illustrates the fingers flexed from their free state whereby the overall axial dimension of spring 62 is compressed from what it would have in its free state. When the two housing parts are assembled together with the flanges 18 and 20 held together by crimp ring 22, the left hand end of tubular part 46 will be spaced a certain axial distance from the right hand end of bearing 30. This dimension will be subject to a certain tolerance.

The relative dimensioning of spring 62 and the axial thicknesses of compensator 60, washer 63, and magnet 58 are chosen, taking into account tolerances as well, such that spring 62 will always be axially compressed either a greater or lesser amount depending upon the tolerance stack-up so that the magnet and compensator are urged as a unit against the right hand end of bearing 30. This will assure that the magnet is located accurately with respect to bearing 30 despite tolerance variations between the various component parts. Stated another way, spring 62 is effective to absorb variations within the tolerance range specified.

Moreover, the spring does not exert objectionable force against bearing 30 which might have a detrimental effect. Although for convenience it may be preferred to affix the central region of spring 62 to the shaft, the appropriate axial compression can be achieved without this being necessarily the case.

Thrust washer 63 has a square hole 65 for fitting onto the square cross section of tip 54.

Shaft 32 is of two-piece construction comprising a main shaft portion 67 into whose right-hand end, the left-hand end of tip 54 is pressed. Shaft 32, compensator 60, magnet 58, spring 62, and thrust washer 63 form a magnet shaft assembly, which itself is a sub-assembly of the sensor. In fabricating this sub-assembly, the compensator and magnet are assembled onto a slightly reduced diameter portion of the right hand end of main shaft portion 67 with the compensator abutting a small shoulder at the left-hand end of this slightly reduced diameter portion.

Sensor 10 further comprises a reed switch 70 which is disposed adjacent magnet 58 and compensator 60. Details of reed switch 70 can be seen from consideration of FIGS. 1 and 4. Reed switch 70 mounts on housing part 14 by means of a retainer 72. Reed switch 70 comprises a glass capsule 74 containing the switch contacts. In the sensor the reed switch is arranged with its longitudinal axis 76 along an imaginary line which may be considered tangential to an imaginary circle concentrical with axis 12. Likewise retainer 72 may be considered to have a longitudinal axis 78 disposed on a diameter passing through axis 12. The axis of the reed switch is therefore seen to be at a right angle to the axis of the retainer.

The preferred construction for retainer 72 comprises a thin metal element formed from a suitable resilient material, spring bronze for example. Retainer 72 is provided with a circular clearance hole 80 for shaft 32. It attaches to housing part 14 to one side of hole 80 and it supports the reed switch at the opposite side.

The retainer has a first portion which is disposed against housing part 14 and which comprises three holes arranged in a triangular pattern. The hole nearest hole 80 aligns with a hole 82 in housing part 14. A screw 84 passes through the retainer's hole and threads into hole 82 to mount the retainer on the one housing part 14. The two other holes are locators through which locating pins 86 and 88 pass, the locating pins being integrally formed with the housing part 14.

Figure 4:
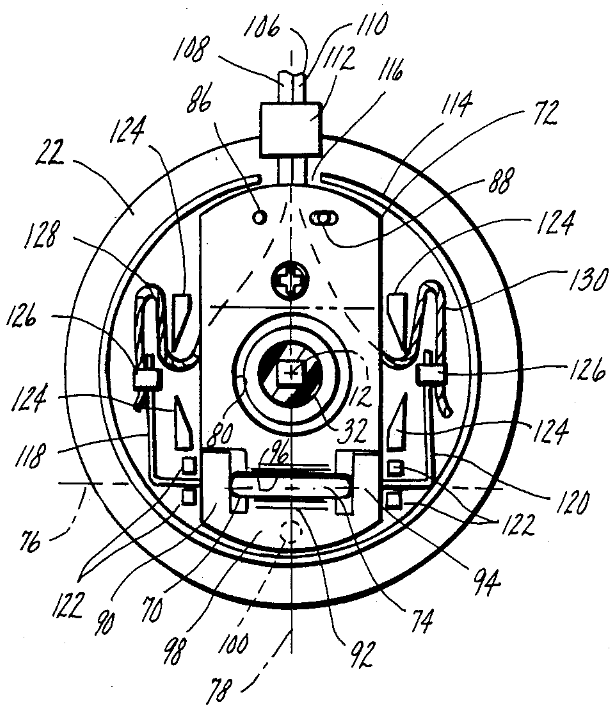
FIG. 4 is a cross sectional view taken in the direction of arrows 4—4 in FIG. 1 and on a slightly reduced scale.
Figure 5:
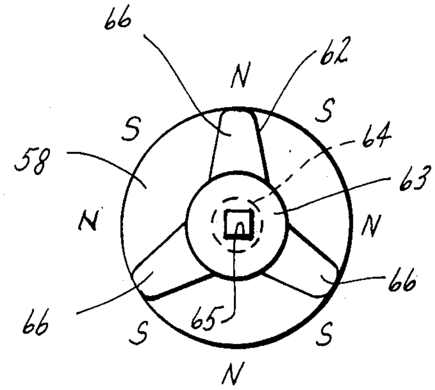
FIG. 5 is view taken substantially in the direction of arrows 5—5 in FIG. 1.

The end of the retainer which holds the reed switch is shaped to allow for the removable mounting of the reed switch without the use of any separate attaching parts. For this purpose the retainer is shaped with three portions which are spaced apart along axis 76 and which are identified by the respective reference numerals 90, 92 and 94. The intermediate portion 92 is disposed centrally of the two other portions 90 and 94 and is contoured with a concave locator 96 to receive the body of the reed switch. The portions 90 and 94 are disposed to bear against the opposite side of the reed switch body and retain the reed switch body within the locator 96. As can be seen in FIG. 4 the three portions 90, 92, and 94 integrally join by means of a circumferentially extending joining portion 98. The portions 90 and 94 project inwardly from this joining portion 98 in an axially spaced apart relation to portion 92 whereby the retainer forms a holder for the reed switch which is inwardly open to provide for the installation, and if necessary, the removal of the reed switch. FIG. 1 shows the portion 94 flexed slightly from its free state to gently hold the reed switch against the locator 96, and portion 90 does the same.

FIGS. 1 and 4 show an adjustment screw 100 threaded into a bore 102 in housing part 14. The co-axis of screw 100 and bore 102 is parallel to axis 12 and the screw has an end 104 which is accessible by means of a suitable adjusting tool (not shown) from the exterior of the housing. For example the left-hand end of screw 100 as viewed in FIG. 1 can have a hole of non-circular cross section. The tip of the screw which is disposed on the interior of the housing is arranged to abut joining portion 98 centrally of the retainer as viewed in FIG. 4. By advancing screw 100 more fully into the housing, retainer 72 is increasingly deflected in the sense indicated by the arrow 105. The advancement of screw 102 is effective to flex retainer 72 in a cantilever fashion, with the free end which holds the reed switch deflecting with basically an axial component although it will be appreciated that there is a small radial component as well. The pitch of the thread of screw 100 is such that a fine adjustment can be achieved. The adjustment is effective to dispose the reed switch in a particular cooperative association with compensator 60 and magnet 58. As will be more fully explained in the ensuing description, this enables the sensor to exhibit an operating characteristic wherein the duty cycle of the reed switch is closely controlled.

The preferred embodiment also comprises an advantageous association of a wiring harness 106 with the sensor. The wiring harness 106 provides for the connection of the reed switch in an external circuit.

The illustrated wiring harness comprises two insulated conductors 108 and 110 respectively. As can be seen in FIGS. 1, 2, 3 and 4 the wiring harness enters the housing in a sense which is parallel with axis 78, i.e. along a radial relative to axis 12. A suitable provision is made between the flanges 18 and 20 at the particular circumferential location so that the wiring harness can pass through. For example, a compressible grommet 112 may be molded around the wiring harness at the location where it passes between the two flanges and the two flanges may be shaped at this location to fit closely around the grommet, compressing it in the process so that the entrance of the wiring harness into the housing is satisfactorily sealed.

Housing part 14 includes a short axial surface 114 which is concentric with axis 12 and onto which the opposite housing part 16 closely fits in a telescopic fashion. This surface 114 is provided with a slot 116 which allows the two conductors 108 and 110 to pass radially inwardly behind retainer 72 as viewed in FIG. 4. The two lead wires are separated from each other as they pass behind retainer 72 as shown by the broken line paths in FIG. 4. One conductor passes between locating pin 86 and a boss 117 in part 14 which contains hole 82. The other conductor passes between boss 117 and the other locating pin 88. The conductors pass to either side of shaft 32, and they pass, as viewed in FIG. 4, from behind the retainer at the longitudinal side edges of the retainer. From there, the insulation is stripped away from the conductors, and the bare conductors are looped in the manner shown in FIG. 4 and ultimately join to the reed switch.

The reed switch comprises a pair of leads 118, 120 which extend axially from opposite axial ends of the glass capsule 74 and each of these is associated with a corresponding reed, or contact, within the glass capsule. Locators 122 are provided for the two leads. After passing through the locators 122 the leads are bent substantially at right angles. It is to these free leads of the reed switch leads that the bare wires of conductors 108, 110 are respectively joined.

The bare wires are shown guided by means of locators 124 formed integrally with the housing part 14, as are the locators 122. The joining of each bare wire to the corresponding lead of the reed switch may be accomplished by a clamp 126, or any other suitable means.

It may be also advantageous to apply an adhesive to the assembled parts in the vicinity indicated by the reference numerals 128 and 130 to aid in holding the wires in place.

It can be perceived that the flexing of retainer 72 by adjustment screw 100 is well-tolerated by the connections of the reed switch leads to the wiring harness conductors.

It can be appreciated from consideration of FIG. 4 that the component parts can be readily assembled. For example, after the bearing 30 has been assembled to housing part 14, for instance by a press fit, a sub-assembly consisting of wiring harness 106, reed switch 70, and retainer 72 can be placed onto the open interior face of that housing part. The various locators serve to accurately locate the sub-assembly and the attachment is made by means of screw 84. Next, the magnet shaft assembly, described above, is inserted into the right hand end of part 30 as viewed in FIG. 1. Then, the other housing part 16 containing part 46 and fitting 52 is assembled. The crimp ring 22 is finally applied to secure the two housing parts in assembled relationship, and thereby complete the assembly.

Figure 6:
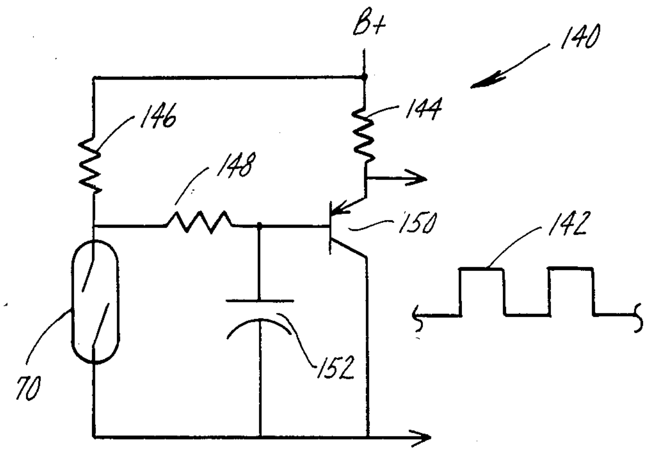
FIG. 6 is an electrical schematic diagram which illustrates usage of the sensor.

FIG. 6 illustrates an example of an electronic circuit 140 with which reed switch 70 is intended to be operatively coupled via wiring harness 106. Circuit 140 produces a rectangular waveform pattern 142. The rectangular waveform is created by the alternating opening and closing of the reed switch contacts (i.e. reeds) as magnet 58 rotates past the reed switch.

The frequency of the waveform will of course be related to the speed of rotation of shaft 32, the higher the shaft speed, the higher the frequency; however, the duty cycle will remain within well-defined limits over the frequency range of interest. Because of the assembled relationship of the various component parts within the sensor, it is possible to attain the desired duty cycle characteristic very conveniently. The construction accurately relates magnet 58 to the housing part 14 which contains reed switch 70. The adjustment screw 100 can be operated to relatively position the reed switch in relation to the magnet to achieve a desired degree of coupling with the magnetic field produced by the rotating magnet. The adjustment is set to produce a waveform having a desired duty cycle characteristic.

Circuit 140 comprises resistors 144, 146 and 148, a PNP transistor 150 and a capacitor 152 operatively coupled with reed switch 70 as shown. The electronic components are located remotely from the sensor with the wiring harness serving to provide a connection of the sensor with them. A suitable power supply is also provided for the circuit and is designated by the reference numeral B+.

The output waveform 142 appears across the transistor's emitter-collector. As the reed switch contacts are closed and opened, the transistor is correspondingly conductive and non-conductive to produce tbe output waveform.

Since the reed switch contacts may exhibit a certain amount of "bounce" when closing there may be corresponding reflections of this bouncing in the waveform when analyzed on an expanded time scale. However this bouncing is relatively minimal such that the illustrated rectangular waveform is representative of the circuit operation.

Because magnet 58 is polarized at regular intervals, the frequency of the waveform will be proportional to speed and distance, i.e. the higher the frequency, the higher the speed, and the greater the distance. However, the duty cycle remains closely controlled within a desired range over the frequency range of operation of the reed switch by the rotating input shaft. The selective positioning of the reed switch in relation to the magnet which is afforded by the unique organization and arrangement of the component parts within sensor 10 provides for an assembled sensor to be quickly and accurately calibrated to produce a desired duty cycle characteristic. Such calibrating is performed under nominal conditions in a calibrating device and may involve the wiring harness being connected to a representative circuit such as that illustrated in FIG. 6 and the resulting output observed on a display or other type of indicator. Screw 100 is adjusted to bring the displayed or otherwise indicated output to a desired duty cycle at a particular speed of rotation of shaft 32 provided by the calibrating device. Once the desired calibration has been obtained it may be desirable to apply a plug to the exposed end of screw 100 so as to preclude any subsequent unauthorized changes in the adjustment. This plug can be of any suitable form, for example a dab of potting compound which is applied and allowed to harden.

The sensor is removed from the calibrating device and is ready to be put to its intended use, for example in an automobile.

One particular advantage of the invention is that it allows a less expensive material to be used for the magnet than might otherwise throught to be the case and this contributes to the sensor's cost-effectiveness. Barium ferrite is a material which can be used for magnet 58 even though in mass production the pole-to-pole variation can vary, and even though it also exhibits a temperature coefficient which reduces the strength of the magnetic field at elevated temperatures.

At the nominal calibration conditions, the sensor can be calibrated to provide a duty cycle characteristic (55%) which over the actual extremes to which the sensor is subjected when put to use will yield a duty cycle having minimum widths for the on and off times. For example the minimum time can be kept above 50% and below 60%. Because of the ability to accurately position the reed switch, a precise degree of coupling can be attained at calibration despite considerable variations in actual characteristics of the several component parts constituting any given sensor. Because of this, lower precision, hence less expensive, parts can be used.

The housing parts may be fabricated from any suitable material; glass-filled nylon is a suitable material. The shaft may comprise a metal part for the tip while the part which is journaled within the bearing may comprise a different material such as nylon or other plastic. The metal tip may be pressed into the nylon.

The configuration which has been illustrated with reference to FIGS. 1 through 5 is representative of a construction suited for one particular usage. Other configurations may be embodied, and advantageously retain the use of many of the same parts.

As an example of such an alternate embodiment, the provision for external mechanical adjustment of the reed switch on the housing part may be deleted. In other words, for example, the adjustment screw 100 can be omitted, leaving the reed switch fixedly mounted on the housing part by the retainer. Indeed a different mounting arrangement for the reed switch other than the retainer might be employed.

The adjustable feature may be unnecessary where the device as assembled can meet a given specification without adjustment, such as in those situations where the sensor is used merely to provide frequency information; in other words where the frequency of the signal, and not the duty cycle, contains the information to be processed.

It is believed appropriate to comment upon the significance of the compensator.

The compensator compensates for certain temperature caused changes in the magnetic flux issued by the magnet; specifically the flux decreases with increasing temperature. The compensator is disposed at least partially in the magnetic circuit between the magnet and the reed switch. The compensator has a characteristic such that its magnetic reluctance increases with temperature. Thus as the sensor's temperature increases, the compensator shunts a decreasing percentage of the magnetic flux which is issued by the magnet. The compensator therefore serves to cause an increasing percentage of the flux to be effective on the reed switch so that even though the magnetic flux from the magnet is decreasing, the effect on the reed switch is attenuated from what would otherwise be the case if the compensator were omitted. Examples of suitable materials for the compensator are 30% nickel--iron alloys. These can provide temperature compensation over a wide temperature range such as might be encountered in automotive usage.

Figure 8:
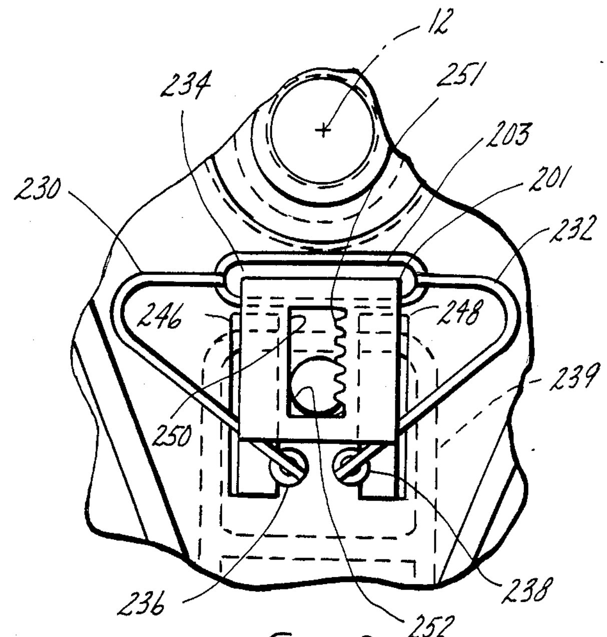
FIG. 8 is a fragmentary view taken in the direction of arrow 8 in FIG. 7.
Figure 7:
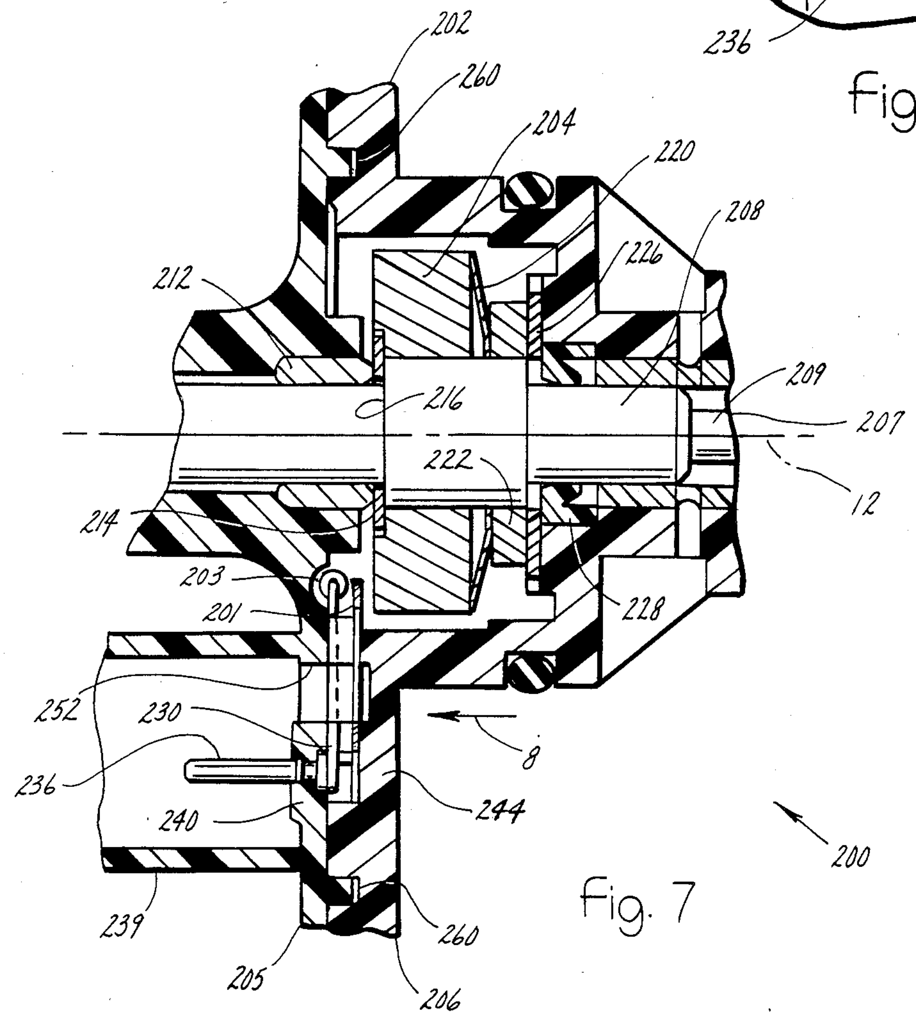
FIG. 7 is a fragmentary longitudinal cross section through another embodiment of sensor.

FIGS. 7 and 8 illustrate a further embodiment of sensor 200 also embodying principles of the present invention.

These drawing figures illustrate detail of the internal mechanism of sensor 200, and this sensor differs principally from that of FIGS. 1-5 in that the compensator itself is used to perform the duty cycle adjustment.

In sensor 200 the compensator 201 is mounted on the housing 202 so as to be at least partially disposed between the reed switch 203 and the magnet 204.

In FIG. 7 housing 202 is seen to comprise two housing parts 205, 206 which in general correspond to the two housing parts 14 and 16 of sensor 10 in FIG. 1 although they differ in certain details. The shaft assembly is coaxial with the sensor main axis and is identified by the general reference numeral 207 and comprises a main shaft portion 208 into whose right hand is pressed a square portion 209. A tubular bearing 212 is pressed into the right hand end of the bore of housing part 205 to form a journal for the shaft assembly 207. A non-magnetic thrust washer 214 is disposed between bearing 212 and a shoulder 216 of shaft portion 208. Magnet 204 fits onto shaft portion 208 to rotate with the shaft and comprises an octagonal counterbore via which it bears against thrust washer 214.

A thrust spring 220, a bronze thrust bearing 222, and a steel thrust washer 226 also are disposed around the shaft assembly as illustrated, and in the assembled condition of the two housing parts 205, 206 these various parts on the shaft serve to axially accurately locate the magnet with respect to the housing part 202 with the spring 220 serving to take up any tolerance variations in the various component parts.

The construction also includes a lip seal 228 within the bore of housing part 206 which provides a sealing contact around the circular right hand end of shaft portion 208.

The arrangement for mounting reed switch 203 on housing 202 involves the use of its own leads 230, 232. This embodiment 203 may comprise a glass reed switch capsule 234 arranged with its main axis lying on a tangent to an imaginary circle concentric with the main axis of the sensor; however the lead wires 230, 232 are reserve bent and brought back at an angle to connect to internal ends of respective terminals 236, 238 which are fixedly mounted in the flange 240 of housing part 205 and which are arranged parallel to the main axis of the sensor. Terminals 236, 238 project from the housing and are bounded by a shell 239 which is integrally formed with housing part 205. This configuration provides for the connection of a mating plug in a wiring harness (not shown) to the two terminals.

Compensator 201 takes the form of a generally flat element having a generally rectangular plan shape. The rectangular shape is seen in FIG. 8. The compensator is captured in a suitable accommodation between the confronting flanges 240, 244 of the two housing parts and is guided for radial movement toward and away from the main axis of the sensor by means of guides 246, 248 acting upon the side edges.

The compensator is provided with an internal slot 250 of generally rectangular shape which has a toothed rack portion 251 along one of its side edges which is parallel to the direction of adjustment of the compensator relative to the main sensor axis. An access hole 252 is provided in flange 240 of housing part 205 and is open to the compensator slot 250. A suitable adjusting tool (not shown) can be inserted into access hole 252 and engaged operatively with the compensator rack 251. The end tip of the adjusting tool contains a pinion of complementary tooth pattern to the rack, and by rotating the tool within the access hole, the engagement of the pinion with the rack serves to radially position the compensator on the housing relative to the main axis of the sensor.

The width of the compensator as viewed in FIG. 8 is such that it spans an appreciable portion of the length of the reed switch capsule 234 and the end portion of the compensator nearest the main axis of the sensor is effective to control the relative shading of the reed switch.

The adjustment procedure may be accomplished in a similar manner to that described above for the embodiment of FIGS. 1-5. Sensor 200 is placed in a suitable calibrating device and its drive shaft rotated at appropriate speed. A suitable monitor is connected to the terminals 236, 238 and the tool inserted into access hole 252 is used to adjust the compensator so that a desired monitored condition (i.e. duty cycle) is obtained for the particular speed.

The assembled condition of the sensor may be such that once the adjustment has been made, it is unnecessary to secure the compensator against further adjustment. In other words it may be unnecessary to use a potting compound or the like to secure the compensator in place once the desired adjustment has been obtained. However, if desired, separate means may be employed to secure the compensator in the final adjusted position.

The embodiment of sensor 200 in FIGS. 7 and 8 also does not utilize the separate crimp ring for joining the two housing parts. Rather the two confronting flanges 240, 244 of the two housing parts are provided with a tongue and groove (or pin and hole) construction forming a joint 260 which is well suited to ultrasonic welding by means of a suitable ultrasonic welding device to join the two housing parts together.

The embodiment of FIGS. 7 and 8 may be deemed to have certain advantages over the embodiment of FIGS. 1 through 5. Both embodiments are however reflective of generic aspects of the invention.

While a preferred embodiment of the invention has been disclosed, it will be appreciated that principles are applicable to other embodiments.

What is claimed is:

1. A speed and distance sensor comprising an input shaft for providing speed and distance input, a magnet which is rotated by said input shaft and which is polarized at regular circumferential intervals to create a varying external magnetic field adjacent the magnet as it rotates, a switch which is adjacent said magnet and which is responsive to rotation of said magnet to be alternately opened and closed by the varying magnetic field from the rotating magnet, in which said magnet and said switch are enclosed by a housing comprising two housing parts which are assembled together, and including positionable means within said housing operable via positioning means at the exterior of the housing for cooperatively relating said switch and magnet in a desired magnetic coupling relationship within the housing to yield a desired duty cycle characteristic of operation of said switch by said magnet.

2. A sensor set forth in claim 1 in which said two housing parts assemble together axially, and wherein said positionable means for cooperatively relating said switch and magnet in a desired magnetic coupling relationship within the housing to yield a desired duty cycle characteristic of operation of said switch by said magnet comprises means for relating the magnet and the switch axially of said magnet in a desired axial relationship to each other to achieve the desired duty cycle characteristic.

3. A sensor as set forth in claim 2 in which said positionable means comprises means positionably mounting said switch on one of said two housing parts, and including a bearing axially positioned on said one housing part and journaling said input shaft, axially compressible resilient means between the other housing part and said magnet to urge said magnet axially toward said hearing for axially locating said magnet in relation to said one housing part.

4. A sensor set forth in claim 3 wherein said axially compressible resilient means comprises an element having a central body portion on said input shaft and yieldable resilient fingers extending radially and axially of said central body portion, said yieldable resilient fingers being flexed when said two housing parts are in assembled relationship, and such flexing providing axial compression of said axially compressible resilient means.

5. A sensor as set forth in claim 4 including a compensator for said magnet disposed between said magnet and said bearing.

6. A sensor as set forth in claim 2 in which said positionable means comprises means positionably mounting said switch on one of said two housing parts and said switch comprises a main body having its own longitudinal axis arranged substantially tangential to an imaginary circle concentric with the axis of said input shaft.

7. A sensor as set forth in claim 6 in which said positionable means for cooperatively relating said switch and magnet in a desired magnetic coupling relationship within said housing to yield a desired duty cycle characteristic of operation of said switch by said magnet serves to position said switch's main body axially on said one housing part.

8. A sensor as set forth in claim 7 in which said positionable means comprises a retainer which releasably holds said switch's main body and which in turn mounts on said one housing part, and said positioning means comprises means acting on said retainer for selectively positioning said retainer on said one housing part to in turn selectively position said switch's main body on said one housing part.

9. A speed and distance sensor comprising an input shaft for providing speed and distance input, a magnet which is rotated by said input shaft and which is polarized at regular circumferential intervals to create a varying external magnetic field adjacent the magnet as it rotates, a switch which is adjacent said magnet and which is responsive to rotation of said magnet to be alternately opened and closed by the varying magnetic field from the rotating magnet, in which said magnet and said switch are enclosed by two housing parts which are assembled together, and including means for cooperatively relating said switch and magnet in a desired relationship to each other within the two assembled housing parts to yield a desired duty cycle characteristic of operation of said switch by said magnet, in which said two housing parts assemble together axially, and wherein said means for cooperatively relating said switch and magnet in a desired relationship to each other within the two assembled housing parts to yield a desired duty cycle characteristic of operation of said switch by said magnet comprises means for axially relating the magnet and the switch in a desired axial relationship to each other to achieve the desired duty cycle characteristic, said switch comprises a main body having its own longitudinal axis which is arranged on said one housing part substantially tangential to an imaginary circle concentric with the axis of said input shaft, said means for cooperatively relating said switch and magnet in a desired relationship to each other within said two housing parts to yield a desired duty cycle characteristic of operation of said switch by said magnet comprises means for axially positioning said switch's main body on said one housing part, and which said switch's main body is releasably held by a retainer which in turn mounts on said one housing part, and means for selectively positioning said retainer on said one housing part to in turn selectively position said switch's main body on said one housing part in which said retainer has its own longitudinal axis which is arranged transverse to the axis of said input shaft, said retainer comprising a central aperture through which said input shaft passes, means for attaching said retainer to said one housing part at a location spaced axially along said retainer in one direction from its aperture, and said retainer comprising means holding the switch's main body in axially spaced relation to the aperture in the opposite direction.

10. A sensor as set forth in claim 9 wherein said means for selectively positioning said retainer on said one housing part comprises an adjusting screw threaded into said one housing part and positionable via the exterior of the two assembled housing parts to engage the retainer.

11. A sensor as set forth in claim 9 in which said retainer's means holding the switch's main body comprises three switch-engaging portions spaced apart in a sense transverse to the axis of the retainer, two of said switch-engaging portions being disposed on one side of the switch's main body and the third on the opposite side of the switch's main body.

12. A sensor as set-forth in claim 11 in which said three switch-engaging portions integrally join by means of a joining portion which is at a free distal axial end of the retainer, said two switch-engaging portions projecting axially inwardly of the retainer's free end and having free inner ends to define in cooperation with said third switch-engaging portion an inwardly open receptacle into which the switch's main body is inserted.

13. A sensor as set forth in claim 12 in which said switch is a reed switch having a pair of contacts contained within a glass capsule forming the main body and wherein the glass capsule is engaged adjacent axial ends thereof by said two switch-engaging portions and said third switch-engaging portion engages the capsule between the axial ends thereof, and further including a locator formed in at least one of said switch-engaging portions for locating of the capsule.

14. A sensor as set forth in claim 11 in which said switch is a reed switch having a glass capsule forming the main body and containing contacts and leads from the respective contacts exiting opposite axial ends of the capsule, said one housing part comprising locators for locating the leads exiting the glass capsule.

15. A sensor as set forth in claim 14 including bends in said leads beyond said locators relative to the glass capsule, said sensor including a wire harness having a pair of separate insulated conductors with terminal ends bare of insulation, said wire harness extending from the exterior of the assembled housing parts and through the interior of the assembled housing parts to locate each terminal end at a corresponding one of said leads beyond the bend thereof relative to the glass capsule, and means for joining each terminal end to a corresponding lead.

16. A sensor as set forth in claim 15 including further locators on said one housing part for locating the respective conductors of the wire harness as they pass through the assembled housing parts.

17. A sensor as set forth in claim 16 in which said wire harness enters the assembled housing parts along a radial relative to the axis of said input shaft with the two conductors of the wire harness separting from each other within the interior of the assembled housing parts and said further locators guiding each of the separated conductors within the sensor.

18. A sensor as set forth in claim 1 in which said positionable means for cooperatively relating said switch and magnet in a desired magnetic coupling relationship within the housing to yield a desired duty cycle characteristic of operation of said switch by said magnet comprises a member on said housing which interacts with the magnetic coupling relationship between the switch and magnet and said positioning means comprises means for selectively positioning said member in relation to said switch and magnet thereby to establish the desired magnetic coupling relationship between the switch and magnet.

19. A sensor as set forth in claim 18 in which said member comprises a compensator having a physical characteristic such that its magnetic reluctance increases with temperature and arranged to cause a decreasing percentage of the magnetic flux issued by said magnet to be shunted by said compensator from said switch with increasing temperature.

20. A sensor as set forth in claim 19 in which said compensator is captured between said two housing parts and is selectively positionable in a radial sense relative to the axis of said input shaft.

21. A sensor as set forth in claim 20 in which said compensator is disposed axially on the sensor adjacent said switch and said magnet.

22. A sensor as set forth in claim 19 in which said compensator is disposed on the sensor axially adjacent said switch and magnet, and said switch is fixedly mounted on one housing part by means of leads extending from opposite sides of a main switch body to join a pair of electrical terminals on said one housing part.

23. A sensor as set forth in claim 22 in which said positioning means for selectively positioning said member comprises a toothed rack on said compensator operable by a complementary shaped tool inserted into an access opening in said housing.

24. A sensor as set forth in claim 18 in which said member is arranged for a selective radial positioning relative to the axis of said input shaft and said positioning means comprises a toothed rack which is operable for selective positioning by an external tool.

25. A sensor as set forth in claim 24 in which said member is axially captured between said two housing parts and said rack is accessible via an access hole in one of said parts.

26. A sensor as set forth in claim 24 in which said member comprises a slot containing said rack and said switch comprises a reed switch having a main body whose axis is arranged generally tangent to an imaginary circle concentric with the axis of said input shaft, said member having a width which substantially spans the length of said main body, and said reed switch being mounted on the housing by means of its own lead wires which project from opposite axial ends of its main body and attach to electrical terminals fixedly mounted on said housing.

27. A speed and distance sensor comprising an input shaft for providing speed and distance input, a magnet which is rotated by said input shaft and which is polarized at regular circumferential intervals to create a varying external magnetic field adjacent the magnet as it rotates, a switch which is adjacent said magnet and which is responsive to rotation of said magnet to be alternately open and closed by a varying magnetic field from the rotating magnet, and a housing on which the shaft is journaled to support the magnet for rotation wherein the switch is a reed switch comprising a capsule containing a pair of magnetically responsive contacts and leads extending from axial ends of the capsule, and wherein the reed switch is arranged with its capsule's axis substantially tangent to an imaginary circle concentric with the axis of said input shaft, the reed switch is held on a retainer which mounts on the housing and which is operable to selectively position the reed switch in relation to the magnet, and said retainer has a longitudinal axis and is attached to the housing adjacent one axial end thereof, wherein the capsule is held on the retainer's opposite axial end, wherein the axis of the retainer is disposed diametrically to the axis of the input shaft and said retainer includes an aperture through which the input shaft passes, and including a wire harness for the sensor comprising a pair of wires which enter the housing and pass behind the retainer when viewed axially from one direction, the wires splitting away from each other to protrude from behind the retainer along longitudinal edges of the retainer when still viewed axially from the same direction, and means joining said wires to the leads from the capsule in outwardly spaced relation to the longitudinal edges of the retainer.

28. A speed and distance sensor comprising an input shaft for providing speed and distance input, a magnet which is rotated by said input shaft and which is polarized at regular circumferential intervals to create a varying external magnetic field adjacent the magnet as it rotates, a switch which is adjacent said magnet and which is responsive to rotation of said magnet to be alternately open and closed by a varying magnetic field from the rotation magnet, and a housing on which the shaft is journaled to support the magnet for rotation wherein the switch is a reed switch comprising a capsule containing a pair of magnetically responsive contacts and leads extending from axial ends of the capsule, and wherein the reed switch is arranged with its capsule's axis substantially tangent to an imaginary circle concentric with the axis of said input shaft, including a member on said housing which is operable by an external tool to selectively control the percentage of the magnetic field issued by said magnet which is allowed to act upon said reed swtich.

29. A speed and distance sensor as set forth in claim 28 in which said magnet and said reed switch are disposed within said housing with said magnet axially confronting said reed switch.

30. A speed and distance sensor as set forth in claim 1 in which said magnet and said switch are so disposed relative to each other within said two housing parts that said magnet axially confronts said switch.

* * * * *